United States Patent
Nabuurs

(10) Patent No.: US 6,533,349 B2
(45) Date of Patent: Mar. 18, 2003

(54) OPEN ROOF CONSTRUCTION FOR A VEHICLE

(75) Inventor: Martinus Wilhelmus Maria Nabuurs, Overloon (NL)

(73) Assignee: Inalfa Industries B.V. (NL)

(*) Notice: Subject to any disclaimer, the term of this patent is extended or adjusted under 35 U.S.C. 154(b) by 0 days.

(21) Appl. No.: 09/766,036

(22) Filed: Jan. 19, 2001

(65) Prior Publication Data

US 2001/0005093 A1 Jun. 28, 2001

Related U.S. Application Data

(63) Continuation-in-part of application No. 09/393,824, filed on Sep. 10, 1999, now abandoned, which is a continuation-in-part of application No. PCT/NL00/00445, filed on Jul. 12, 1999.

(30) Foreign Application Priority Data

Jul. 27, 1998 (NL) .............................................. 1009743
Oct. 2, 1998 (NL) .............................................. 1010240

(51) Int. Cl.⁷ .............................................. B60J 7/057
(52) U.S. Cl. .................... 296/216.08; 296/223; 384/15; 16/95 R
(58) Field of Search ...................... 276/216.06–216.08, 276/223; 16/87.4 R, 95 R; 384/15

(56) References Cited

U.S. PATENT DOCUMENTS

| | | | | |
|---|---|---|---|---|
| 2,182,019 A | * | 12/1939 | Eisele | .......................... 384/15 |
| 2,190,462 A | * | 2/1940 | Votypka | ............. 296/216.06 X |
| 3,290,087 A | | 12/1966 | Werner | ........................ 296/223 |
| 4,376,543 A | * | 3/1983 | Sakagami | .................. 384/15 X |
| 4,711,484 A | * | 12/1987 | Tuerk | .......................... 296/105 |
| 4,752,099 A | | 6/1988 | Roos et al. | .................. 296/223 |
| 4,892,416 A | * | 1/1990 | Hassler, Jr. | ................ 384/15 X |
| 4,969,681 A | | 11/1990 | Schleicher et al. | ......... 296/223 |
| 5,676,417 A | * | 10/1997 | Olivier | ........................ 16/95 R |
| 6,145,911 A | * | 11/2000 | Sturt et al. | ........... 296/65.13 X |

FOREIGN PATENT DOCUMENTS

| | | | | |
|---|---|---|---|---|
| DE | 1575424 | * | 1/1970 | .................. 384/15 |
| DE | 42 27 400 A | | 2/1994 | |
| DE | 195 25 839 C | | 8/1996 | |
| EP | 0 442 773 A1 | | 8/1991 | |
| EP | 0 786 370 A1 | | 7/1997 | |
| GB | 0671872 | * | 5/1952 | .................. 384/15 |
| GB | 2 122 955 A | | 1/1984 | |
| WO | PCT/NL99/00445 | | 7/1999 | |

OTHER PUBLICATIONS

U.S. patent application Ser. No. 09/744,266.

\* cited by examiner

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof comprises a stationary part with at least one guide rail, which is to be secured to the roof. An adjustable closure panel is supported by a mechanism which is capable of sliding movement in the guide rail. The closure panel can be adjusted between a closed position, in which it closes the roof opening, and an open position, in which it at least partially releases the roof opening. The guide rail is provided with an adjustable cover, which can be adjusted synchronously with the movements of the mechanism, or can be made deformable locally.

12 Claims, 7 Drawing Sheets

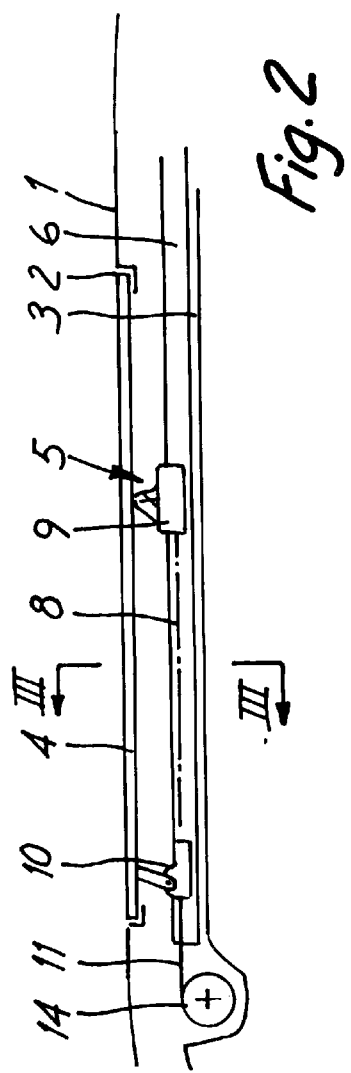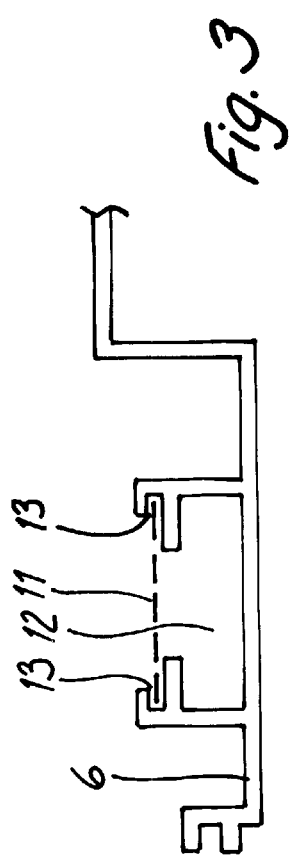

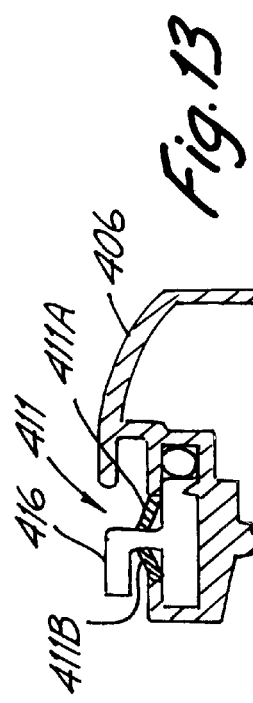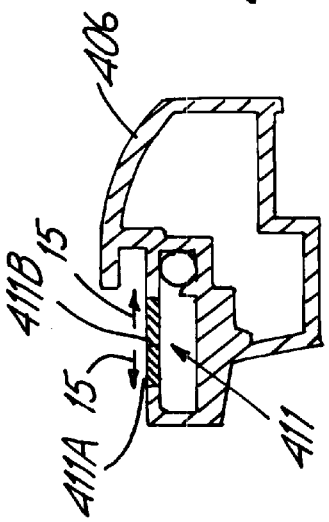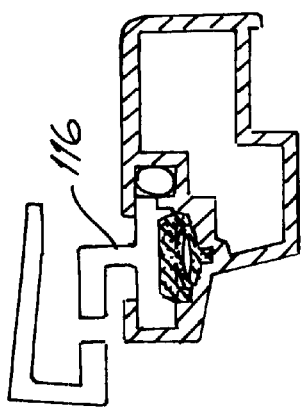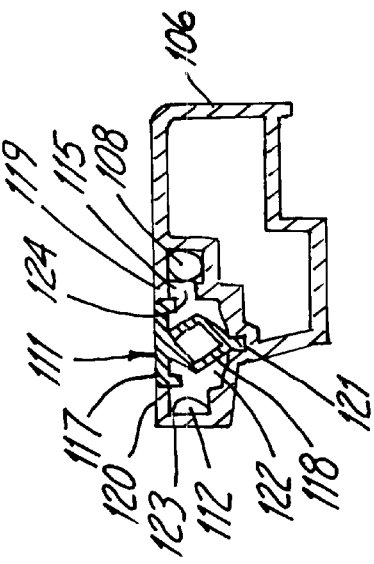

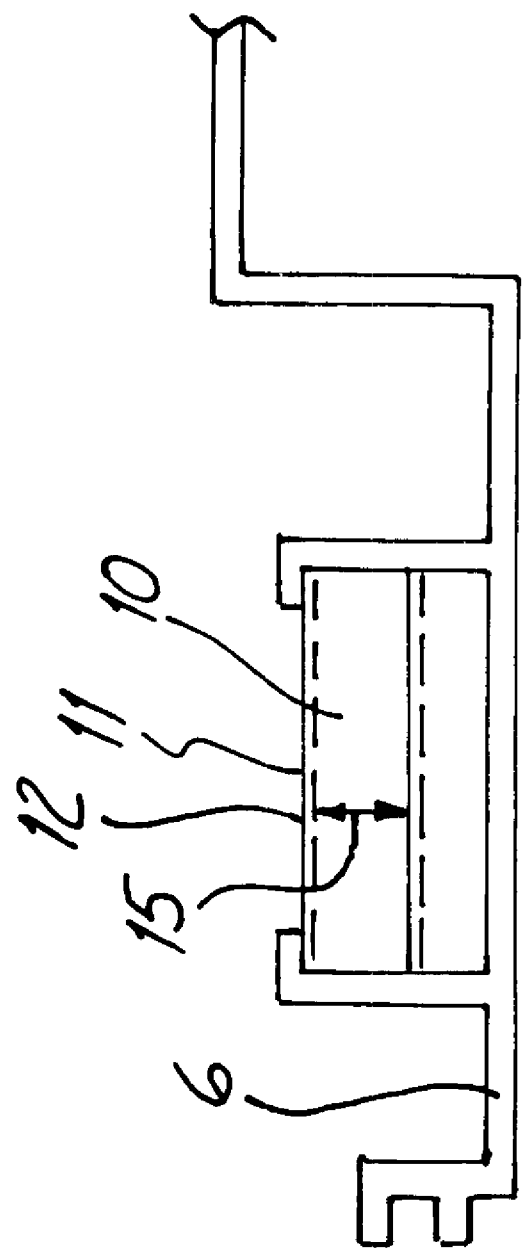

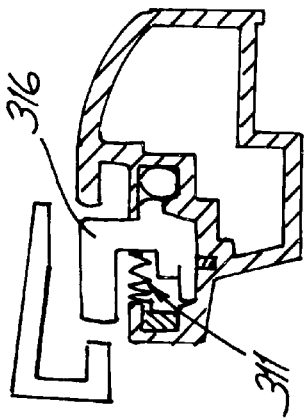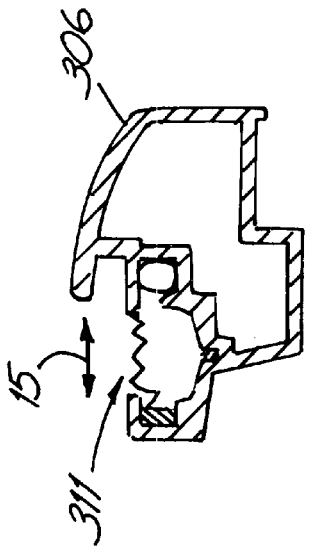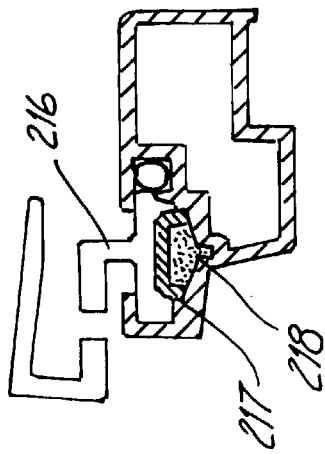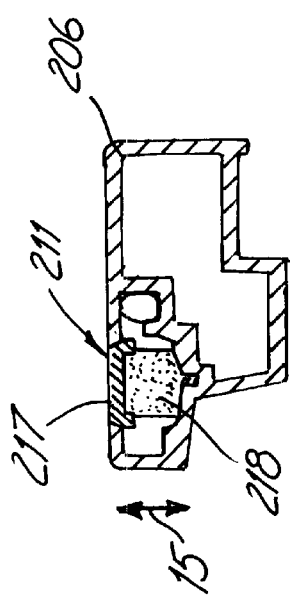

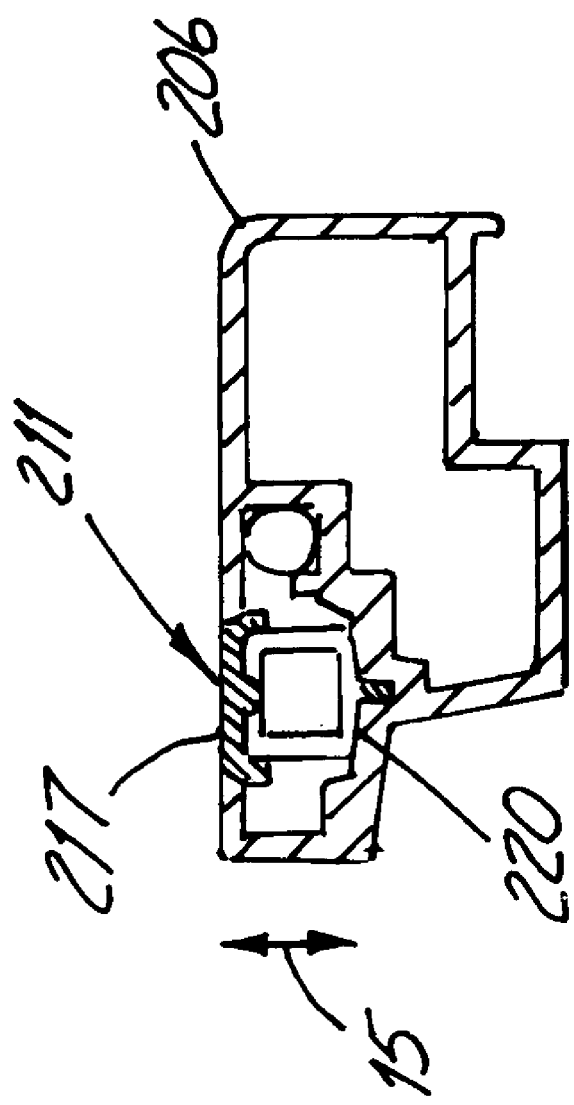

US 6,533,349 B2

OPEN ROOF CONSTRUCTION FOR A VEHICLE

CROSS REFERENCE TO RELATED APPLICATION

This application is a continuation-in-part of application entitled "OPEN ROOF CONSTRUCTION FOR A VEHICLE" having Ser. No. 09/393,824, filed Sep. 10, 1999 abandoned, (the content of which is hereby incorporated by reference in its entirety), which claims priority of Netherlands patent application No. 1010240, filed Oct. 2, 1998; and this application is further a continuation-in-part of application entitled "OPEN ROOF CONSTRUCTION FOR A VEHICLE, AND A VEHICLE HAVING SUCH OPEN CONSTRUCTION" having International Application No. PCT/NL00/00445, filed Jul. 12, 1999, and published in English (the content of which is hereby incorporated by reference in its entirety), which claims priority of Netherlands patent application No. 1009743, filed Jul. 27, 1998.

BACKGROUND OF THE INVENTION

The invention relates to an open roof construction. Such open roof constructions are known in a variety of embodiments thereof. Increasingly heavy demands are made on said open roof constructions as regards to the amount of noise that is produced upon adjustment of the closure means and as regards to the smooth movement of the working parts.

SUMMARY OF THE INVENTION

The object of the invention is to provide a further improved open roof construction.

In order to accomplish that objective, a cover is provided for the guide rails of the mechanism, so that the mechanism is protected against penetrating dirt, and a smooth, low-noise movement of the parts in question in the guide rail can be achieved. Also, the extent of wear on said parts will be reduced.

The invention will be explained in more detail hereafter with reference to the drawing, which schematically illustrates an embodiment of the invention.

BRIEF DESCRIPTION OF THE DRAWINGS

FIG. 2 is a larger-scale, very schematic sectional view along line II—II in FIG. 1.

FIG. 3 is an even larger-scale, very schematic sectional view along line III—III in FIG. 2.

FIG. 5 is an enlarged cross sectional view along the line V—V in FIG. 4 showing the cover in a condition closing the groove in the guide rail.

FIG. 6 is a view corresponding to that of FIG. 5, but showing the cover in a deformed state.

FIG. 7 is a cross sectional view of the cover in a relaxed state.

FIG. 8 is a cross sectional view of a first embodiment of a deformable cover.

FIGS. 9 and 10 are cross sectional views corresponding to those of FIGS. 5 and 6, but illustrating another embodiment.

FIGS. 11 and 12 are cross sectional views corresponding to those of FIGS. 5 and 6, but illustrating a further embodiment.

FIGS. 13 and 14 are cross sectional views corresponding to those of FIGS. 5 and 6, but illustrating a further embodiment.

FIG. 15 is a cross sectional view corresponding to that of FIG. 5, but illustrating a further embodiment.

DESCRIPTION OF THE PREFERRED EMBODIMENT

Figure 1:
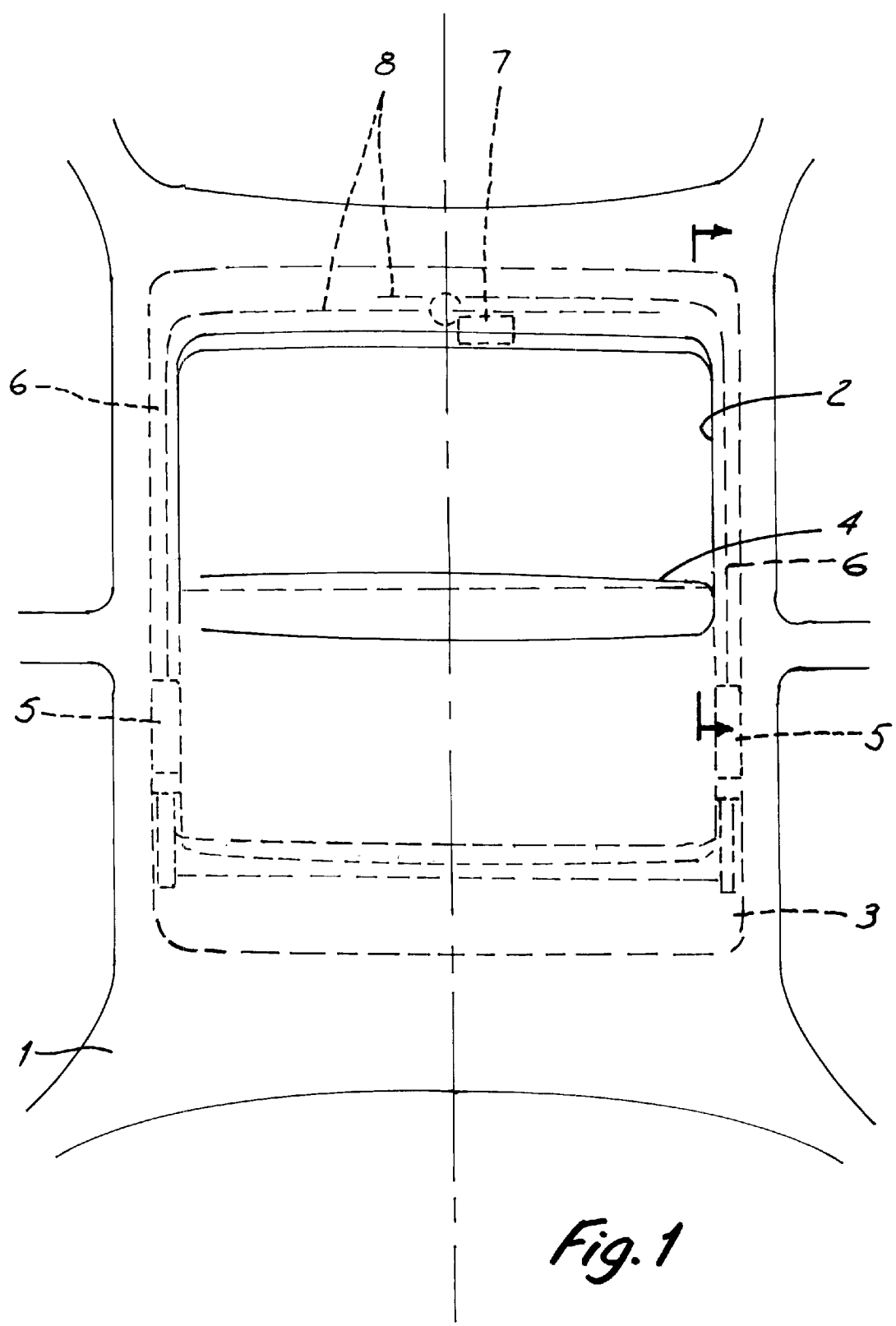
FIG. 1 is a schematic plan view of a vehicle roof fitted with an open roof construction of the invention.

The drawing, and in the first instance FIG. 1, shows a fixed roof 1 of a motor vehicle, such as a passenger car, wherein a roof opening 2 is formed in fixed roof 1 for mounting an open roof construction therein. Said open roof construction comprises a stationary frame 3 or similar stationary means to be fixed to the vehicle for movably supporting a closure means 4.

In the illustrated embodiment, the open roof construction is a so-called sliding roof or tilting-sliding roof, which in this embodiment comprises a more or less rigid and, preferably, transparent panel 4 as the closure means. The panel 4 is capable of selectively closing the roof opening 2 or releasing it to a greater or lesser extent. To this end, panel 4 is laterally supported by mechanisms 5, which are slidably accommodated in guide rails 6, which are mounted on frame 3 or form part thereof, and which extend parallel to each other in a longitudinal direction on either side of roof opening 2 and rearwards thereof. Said mechanisms 5 can be moved synchronously in said guide rails 6, moving said panel 4 not only in the longitudinal direction but commonly also in a vertical direction thereby. To this end, the mechanisms 5 are operated from a driving device 7, such as an electric motor, for example via pull-push cables 8.

As is shown in FIG. 2, said pull-push cables 8 are connected to slides 9 of mechanisms 5, which slides 9 are slidably accommodated in guide rails 6. By moving slides 9, parts of the mechanisms 5 that mate therewith are also moved so as to adjust panel 4. The front side of panel 4 can be pivotally supported by a front sliding shoe 10, which is likewise guided in associated guide rails 6. In order to have the movement of slides 9 in guide rails 6 take place smoothly and quietly in a low-wear environment, a first embodiment of the invention proposes to cover each of the guide rails with a cover in the form of a cover or curtain 11 to be wound and unwound.

As is shown in FIG. 3, said cover 11 covers the open upper side of a groove 12 of each guide rail 6, and it is guided with its side edges in lateral, opposed horizontal grooves 13 present in the upper side of each guide rail 6.

A spring-biased winding roll 14 (FIG. 2) of cover 11 is mounted at the front end of each guide rail 6, and the free, end of cover 11 is attached to sliding shoe 10, so that the cover 11 will follow the movements of the sliding shoe 10. Sliding shoe 10 will move rearwards from a front position when panel 4 is being moved rearward to an open position, above or under fixed roof 1. As a result, panel 4 no longer covers the guide rails, and said covering function is now taken over by covers 11 in that they are taken along towards the rear along with the sliding shoes 10, thereby covering the part of guide rails 6 that has just been uncovered by panel 4. As a result, any dirt entering through the roof opening cannot find its way into this part of the guide rails 6. When panel 4 and sliding shoes 10 are moved back, cover 11 will automatically be wound on winding roll 14 again as a result of the spring tension on said winding roll 14.

Referring to FIGS. 8–11, a cover 11, 111, 311 or 411, respectively, may also be a deformable cover, which lies on guide rails 6, 106, 306, 406 and which allows the respective parts in the guide rails 6, 106, 306, 406 to pass by deforming (herein schematically illustrated by arrows 15).

Figure 4:
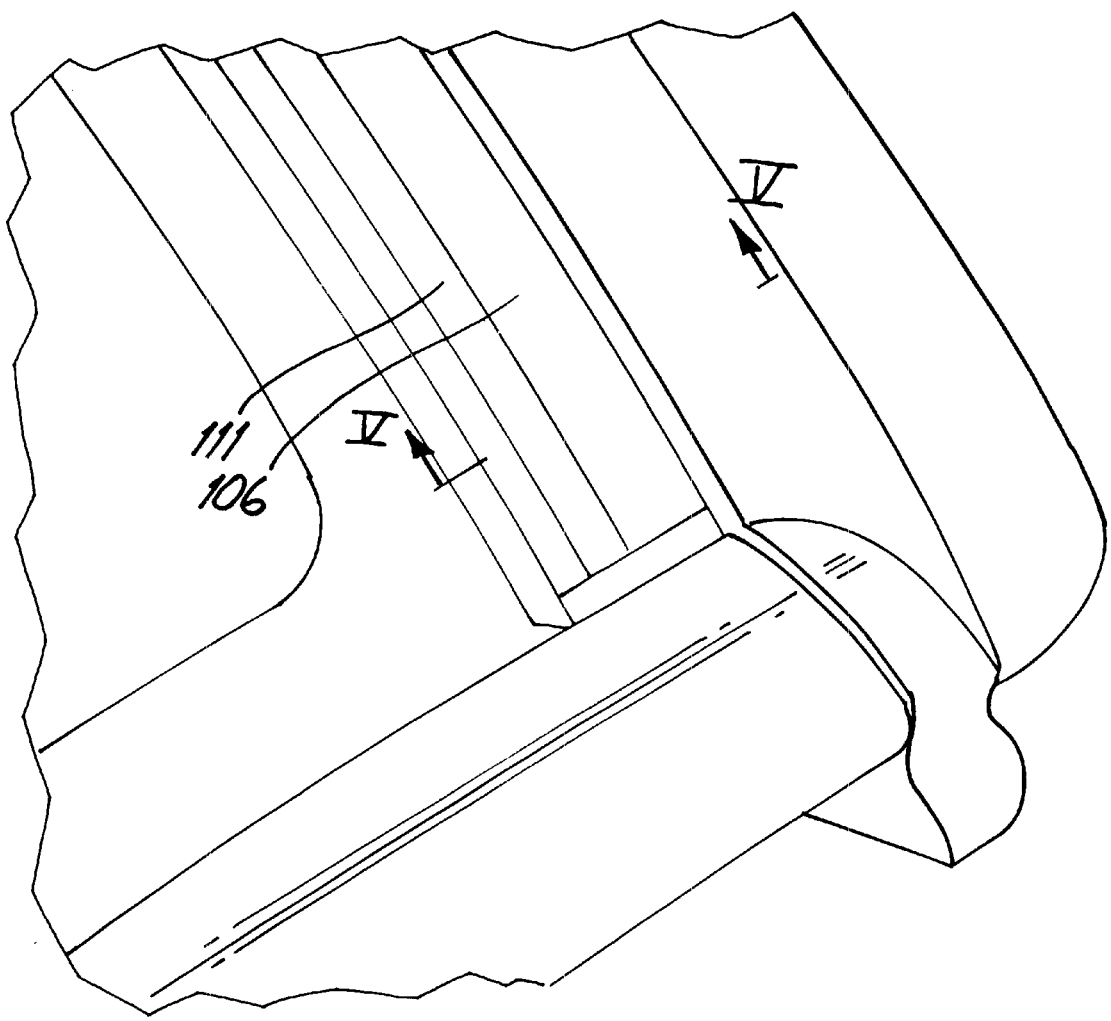
FIG. 4 is a perspective view of a portion of a vehicle roof including a second embodiment of the open roof construction according to the invention.

FIG. 4 illustrates the deformable guide cover 111 as incorporated in another open roof construction. FIG. 4 shows the guide rail 106 having a groove 112, which is covered by the cover 111. Although the cover 111 deforms in the vertical direction with passage of a portion of the closure panel, the cover 111 is stationary with respect to a longitudinal extent of the guide rail 106. The structure of the cover 111 and its co-operation with the guide rail 106 is shown in more detail in FIGS. 5–7. In this embodiment, it is shown that next to the groove 112 and in communication therewith is a cable groove 115 slidably guiding the pull-push cable 108 to drive a part 116 of the operating mechanism for the closure means of the open roof construction.

The guide rail cover 111 includes, in this embodiment, a flat top part 117 and a resilient support member 118, which loads the top part 117 of the cover 111 in an upward direction thereby urging it in engagement with flange parts 119 and 120 defining the open upper side of the groove 112. The transverse dimension of the top part 117 is larger than that of the open upper side of the groove 112 between the flanges 119 and 120, so that the top part 117 is able to close the open upper side of the groove 112 from below, while it is prevented from being pushed out of the groove 112.

In the embodiment illustrated, the resilient support member 118, which performs a spring function, extends substantially the length of the top part 117 and is mounted in the bottom of the groove through a dovetail joint 121. The bottom of the groove 112 is partly formed by a recess 122 in the groove 112 in order to take up at least a part of the cover 111 to allow passage of the respective part 116 of the operating mechanism when the corresponding portion of top part 117 is urged downwards into said recess 122 (cf. FIG. 6). In other words, as the part 116 of the operating mechanism moves along the guide rail, the part 116 forces a portion of the cover 111 proximate the part 116 downward as illustrated in FIG. 6, while other portions of the cover 111 further from the part 116 remain in the position as illustrated in FIG. 5. On both sides of the recess there is a guide surface 123, 124 to guide and support part 116 without interfering with the cover 111.

In the embodiment illustrated, the resilient support member 118 includes two legs or wall parts, which have a bending point and these wall parts together perform a spring function and allow the downward movement of the top part 117 and thereby a deformation of the cover 111. This enables the part 116 of the operating mechanism to deform the cover 111 locally in a downward direction to enable a movement of said part 116. After passage of said part 116, the support member 118 pushes the top part 117 of the cover 111 upwardly again in engagement with the flanges 119 and 120 thereby reclosing the groove 112.

FIG. 7 shows a completely relaxed state of the support member 118 in which the wall parts are substantially straight. This means that in the closed position of the cover (FIG. 5), there is still an upward force on the top part 117, so that a proper seal against the flanges 119 and 120 is obtained. In this and other embodiments, the deformation of the cover is such that it remains within the guide rail when it is deformed.

FIGS. 9 and 10 show a further embodiment of the cover 211 in which the support member 218 is now an elastic body, which can comprise a compressible foam (e.g. plastic) or a gas filled cushion 220 (as illustrated in FIG. 15, which operates in a manner similar to member 218 of FIGS. 9 and 10) or the like acting as a spring member. The cover 211 is held stationary with respect to a longitudinal extent of the guide rail 206. As apparent from the embodiments of FIGS. 5–7, 9, 10 and 15, support members 118, 218 and 220 function as springs for the corresponding covers 111 and 211. As appreciated by those skilled in the art, other forms of springs can be used. Such springs can be continuous under the cover and along the guide rail, or be a series of spaced apart spring members.

FIGS. 11 and 12 show another variant of the cover which is now an elastically deformable in a horizontal or lateral direction (i.e. transversely to the longitudinal extent of guide rail 306, while being secured in a stationary position with respect to a longitudinal extent of the guide rail 306. The cover 311 can comprise a compressible material (foam), bendable material or a foldable zigzag sheet, or the like, which a portion of may be moved (collapsed or compressed) locally in the lateral (horizontal) direction when part 316 of the operating mechanism must pass to operate the roof. The cover 311 can extend transversely from one (as illustrated) or both sides of the guide rail 306. The part 316 can be shaped (tapered leading and following surfaces) such that the cover 311 is deformed smoothly.

FIGS. 13 and 14 illustrate a deformable cover 411 comprising bendable and/or compressible portions 411A and 411B that extend along the length of the guide rail 406. A part 416 of a corresponding operating mechanism extends between the portions 411A and 411B as the part 416 is moved in the guide rail 406. By using two portions 411A and 411B that come together, any opening proximate the part 416 into the recess is minimized because the portions 411A and 411B need to deform only slightly. In a further embodiment, portions 411A and 411B can be strips of bendable bristles.

It will be apparent from the foregoing that the invention provides an open roof construction whose guide rails are protected against fouling, thus ensuring a smooth, low-noise and low-wear movement of parts in the guide rails. The cover also makes the open roof construction look more attractive from above when the panel is open.

The invention is not restricted to the above-described embodiment as shown in the drawing, which can be varied in several ways without departing from the scope of the invention. Although illustrated wherein the covers herein described close an upward facing recess of the guide rails, it should be noted that each of the embodiments can be used with guide rails having recesses that open sideways or inwardly to the roof opening such as described in PCT/NL99/00445. Closure means 4, for example, may also be comprised of multiple panels, a foldable material, louvers and the like. An alternative or additional feature would be to provide a cover on the rear side of the mechanisms.

What is claimed is:

1. An open roof construction for a vehicle having an opening in its fixed roof, comprising a stationary part with at least one guide rail, which is to be secured to the roof, an adjustable closure panel which is supported by an operating mechanism which is capable of sliding movement in said guide rail, which closure panel can be adjusted between a closed position, in which it closes said roof opening, and an open position, in which it releases said roof opening, at least partially so, on the front side, said guide rail being provided with a deformable cover for protecting the guide rail against penetrating dirt, wherein said guide rail comprises at least one groove having an open upper side where said cover is provided, wherein said cover is positioned on the guide rails, stationary in a longitudinal extent of the guide rail and which allows a part of said operating mechanism in the guide rail to pass by being deformed, and wherein the deformable cover is received within the groove of the guide rail and includes a top part adapted to close the open upper side of the groove from below, and to be deformed downwardly by said part of the operating mechanism.

2. The open roof construction of claim 1, wherein the lateral dimension of the top part of the deformable cover is larger than that of the open upper side of the groove in the guide rail.

3. The open roof construction of claim 1, wherein the top part is a flat part which is supported by a spring member received within the groove of the guide rail.

4. The open roof construction of claim 3, wherein the spring member body extends substantially a full length of the top part of the cover.

5. The open roof construction of claim 3, wherein the spring member is a body having two wall parts extending upwardly in an undeformed state and being elastically deformable to a loaded position by bending.

6. The open roof construction of claim 3, wherein the spring member body is a compressible body.

7. The open roof construction of claim 6, wherein the compressible body is a foam body.

8. The open roof construction of claim 6, wherein the compressible body is a gas-filled cushion.

9. The open roof construction of claim 1, wherein the groove in the guide rail is provided with a recessed portion adapted to at least partly receive the cover in a deformed state, said groove further including guide surfaces on both sides of said recessed portion for supporting and guiding said part of the operating mechanism for the closure panel.

10. An open roof construction for a vehicle having an opening in its fixed roof, comprising a stationary part with at least one guide rail, which is to be secured to the roof, an adjustable closure panel which is supported by an operating mechanism which is capable of sliding movement in said guide rail, which closure panel can be adjusted between a closed position, in which it closes said roof opening, and an open position, in which it releases said roof opening, at least partially so, on the front side, said guide rail being provided with a deformable cover for protecting the guide rail against penetrating dirt, wherein said guide rail comprises at least one groove having an open upper side where said cover is provided, wherein said cover is positioned on the guide rails, stationary in a longitudinal extent of the guide rail and which allows a part of said operating mechanism in the guide rail to pass by being deformed, and wherein the cover is deformable locally in a lateral direction of the guide rail and the cover is an elastically foldable zigzag sheet.

11. The open roof construction of claim 1, wherein guide rails are mountable on either side of the roof opening, each guide rail having its own cover means.

12. An open roof construction for a vehicle having an opening in its fixed roof, comprising a stationary part with at least one guide rail, which is to be secured to the roof, an adjustable closure panel which is supported by an operating mechanism which is capable of sliding movement in said guide rail, which closure panel can be adjusted between a closed position, in which it closes said roof opening, and an open position, in which it releases said roof opening, at least partially so, on the front side, said guide rail being provided with a deformable cover for protecting the guide rail against penetrating dirt, wherein said guide rail comprises at least one groove having an open upper side where said cover is provided, wherein said cover is positioned on the guide rails, stationary in a longitudinal extent of the guide rail and which allows a part of said operating mechanism in the guide rail to pass by being deformed, and wherein the deformable cover is accommodated within the guide rail and remains within the guide rail upon deformation.

* * * * *